United States Patent
Gupta et al.

(10) Patent No.: US 11,036,189 B2
(45) Date of Patent: *Jun. 15, 2021

(54) ENERGY DISAGGREGATION TECHNIQUES FOR LOW RESOLUTION WHOLE-HOUSE ENERGY CONSUMPTION DATA

(71) Applicants: Abhay Gupta, Cupertino, CA (US); Alaa Kharbouch, Santa clara, CA (US); Vivek Garud, Cupertino, CA (US); Hsien-Ting Cheng, Sunnyvale, CA (US)

(72) Inventors: Abhay Gupta, Cupertino, CA (US); Alaa Kharbouch, Santa clara, CA (US); Vivek Garud, Cupertino, CA (US); Hsien-Ting Cheng, Sunnyvale, CA (US)

(73) Assignee: Bidgely, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 16/100,557

(22) Filed: Aug. 10, 2018

(65) Prior Publication Data

US 2018/0348711 A1 Dec. 6, 2018

Related U.S. Application Data

(63) Continuation of application No. 13/870,838, filed on Apr. 25, 2013, now Pat. No. 10,114,347.

(Continued)

(51) Int. Cl.
*G05B 13/02* (2006.01)
*G05B 15/02* (2006.01)

(52) U.S. Cl.
CPC .......... *G05B 13/02* (2013.01); *G05B 15/02* (2013.01); *G05B 2219/2642* (2013.01);

(Continued)

(58) Field of Classification Search
None
See application file for complete search history.

(56) References Cited

U.S. PATENT DOCUMENTS 4,858,141 A * 8/1989 Hart .................. G01R 21/1331
702/61
8,024,073 B2 9/2011 Imes et al.
(Continued)

FOREIGN PATENT DOCUMENTS

CA 2753809 A1 3/2013
CA 2864739 A1 6/2013
(Continued)

OTHER PUBLICATIONS

Hart 'Nonintrusive Appliance Load Monitoring' Proceedings of the IEEE, vol. 80, No. 12, pp. 1870-1891, Dec. 1992.*
(Continued)

*Primary Examiner* — Bernard G Lindsay
(74) *Attorney, Agent, or Firm* — Landmark Intellectual Property Law, PC; Gregory M Murphy (57) ABSTRACT

The present invention is generally directed to methods of disaggregating low resolution whole-house energy consumption data. In accordance with some embodiments of the present invention, methods may include steps of: receiving at a processor the low resolution whole house profile; selectively communicating with a first database including non-electrical information; selectively communicating with a second database including training data; and determining by the processor based on the low resolution whole house profile, the non-electrical information and the training data, individual appliance load profiles for one or more appliances.

10 Claims, 8 Drawing Sheets

Related U.S. Application Data (60) Provisional application No. 61/638,265, filed on Apr. 25, 2012, provisional application No. 61/754,436, filed on Jan. 18, 2013.

(52) U.S. Cl.
CPC ........... *H02J 2310/14* (2020.01); *Y02B 70/30* (2013.01); *Y04S 20/242* (2013.01); *Y04S 20/30* (2013.01)

(56) References Cited

U.S. PATENT DOCUMENTS

| | | | |
|---|---|---|---|
| 8,447,541 B2 | 5/2013 | Rada et al. | |
| 8,719,186 B2 | 5/2014 | Amram et al. | |
| 9,275,065 B1 | 3/2016 | Ganesh et al. | |
| 10,114,347 B2* | 10/2018 | Gupta | G05B 13/02 |
| 10,175,276 B2 | 1/2019 | Fishburn et al. | |
| 2003/0229572 A1 | 12/2003 | Raines et al. | |
| 2004/0204193 A1 | 10/2004 | Li et al. | |
| 2005/0065893 A1 | 3/2005 | Josephson | |
| 2005/0116836 A1 | 6/2005 | Perry et al. | |
| 2006/0161450 A1 | 7/2006 | Carey et al. | |
| 2007/0123166 A1 | 5/2007 | Sheynman et al. | |
| 2008/0281473 A1 | 11/2008 | Pitt | |
| 2009/0045804 A1* | 2/2009 | Purling | G01D 4/008 324/140 R |
| 2009/0093916 A1 | 4/2009 | Parsonnet et al. | |
| 2009/0195349 A1 | 8/2009 | Trader-Thompson et al. | |
| 2009/0204368 A1 | 8/2009 | Bickel | |
| 2010/0064001 A1 | 3/2010 | Daily | |
| 2010/0076615 A1 | 3/2010 | Daniel et al. | |
| 2010/0305889 A1* | 12/2010 | Tomlinson, Jr. | G01D 1/00 702/62 |
| 2011/0046805 A1 | 2/2011 | Bedros et al. | |
| 2011/0046806 A1 | 2/2011 | Nagel et al. | |
| 2011/0046904 A1* | 2/2011 | Souilmi | G01D 4/004 702/62 |
| 2011/0082599 A1 | 4/2011 | Shinde et al. | |
| 2011/0112780 A1* | 5/2011 | Moss | H02J 13/0075 702/62 |
| 2011/0144819 A1 | 6/2011 | Andrews et al. | |
| 2011/0161251 A1 | 6/2011 | Carey et al. | |
| 2011/0251807 A1* | 10/2011 | Rada | G01D 4/00 702/61 |
| 2011/0277471 A1 | 11/2011 | Shinnar | |
| 2012/0041696 A1* | 2/2012 | Sanderford, Jr. | G06Q 50/06 702/62 |
| 2012/0053740 A1 | 3/2012 | Venkatakrishnan et al. | |
| 2012/0101653 A1* | 4/2012 | Tran | G01D 4/004 700/296 |
| 2012/0131324 A1 | 5/2012 | Ansari et al. | |
| 2012/0166115 A1 | 6/2012 | Apostolakis | |
| 2012/0246040 A1 | 9/2012 | Littrell | |
| 2012/0290230 A1 | 11/2012 | Gonzalez et al. | |
| 2012/0296799 A1 | 11/2012 | Playfair et al. | |
| 2013/0066479 A1 | 3/2013 | Shetty et al. | |
| 2013/0103215 A1 | 4/2013 | Dai et al. | |
| 2013/0103656 A1 | 4/2013 | Loureda et al. | |
| 2013/0110621 A1 | 5/2013 | Gupta et al. | |
| 2013/0144451 A1 | 6/2013 | Kumar et al. | |
| 2013/0289788 A1 | 10/2013 | Gupta et al. | |
| 2013/0307702 A1 | 11/2013 | Pal et al. | |
| 2013/0338948 A1* | 12/2013 | Zeifman | G01D 4/002 702/60 |
| 2014/0039965 A1 | 2/2014 | Steven et al. | |
| 2014/0129040 A1 | 5/2014 | Emadi et al. | |
| 2014/0129160 A1 | 5/2014 | Tran | |
| 2014/0142724 A1 | 5/2014 | Park et al. | |
| 2014/0149056 A1 | 5/2014 | Lelkens et al. | |
| 2014/0200725 A1 | 7/2014 | Dillen | |
| 2014/0207298 A1 | 7/2014 | Gupta et al. | |
| 2014/0229405 A1 | 8/2014 | Govrin et al. | |
| 2014/0244057 A1 | 8/2014 | Hamouz et al. | |
| 2014/0324240 A1* | 10/2014 | Thottan | G01D 4/00 700/291 |
| 2015/0012147 A1* | 1/2015 | Haghighat-Kashani | G06Q 30/02 700/291 |
| 2015/0039149 A1 | 2/2015 | Forbes, Jr. | |
| 2015/0137792 A1 | 5/2015 | Filippi et al. | |
| 2015/0142347 A1 | 5/2015 | Mohan et al. | |
| 2015/0142695 A1 | 5/2015 | He et al. | |
| 2015/0160099 A1 | 6/2015 | Hamouz et al. | |
| 2015/0215700 A1 | 7/2015 | Sun et al. | |
| 2015/0268281 A1 | 9/2015 | Haghighat-Kashani | |
| 2015/0276828 A1 | 10/2015 | Filippi et al. | |
| 2016/0005015 A1 | 1/2016 | Curtis | |
| 2016/0018835 A1 | 1/2016 | Gaasch et al. | |
| 2016/0070285 A1 | 3/2016 | Gupta et al. | |
| 2016/0070286 A1 | 3/2016 | Gupta et al. | |
| 2016/0238640 A1 | 8/2016 | Maasoumy et al. | |
| 2017/0176967 A1 | 6/2017 | Takada et al. | |
| 2017/0315855 A1 | 11/2017 | Doblander et al. | |
| 2018/0032758 A1 | 2/2018 | Wang et al. | |
| 2018/0364666 A1 | 12/2018 | Haghighat-Kashani et al. | |
| 2019/0050430 A1 | 2/2019 | Gupta et al. | |

FOREIGN PATENT DOCUMENTS

| | | |
|---|---|---|
| CA | 2864758 A1 | 8/2013 |
| CN | 102280935 A | 12/2011 |
| CN | 103280840 A | 9/2013 |
| WO | 2011130670 A3 | 12/2011 |

OTHER PUBLICATIONS

Ruzzelli et al. 'Real-Time Recognition and Profiling of Appliances through a Single Electricity Sensor' 2010 7th Annual IEEE Communications Society Conference on Sensor, Mesh and Ad Hoc Communications and Networks (SECON), Boston, MA, 2010, pp. 1-9.*

Akbari, H.: "Validation of an algorithm to disaggregate whole-building hourly electrical load into end uses", Energy, vol. 20, Issue 12, 1995, pp. 1291-1301.

Andrea Spikes, "Smart Meters and a Smarter Grid", (May 16, 2011), U.S. Department of Energy. (Year: 2011).

Batra et al. "Neighbourhood NILM: A Big-data Approach to Household Energy Disaggregation" In: Cornell University Library/ Computer Science/Machine Learning, Oct. 26, 2015 [online][retrieved on Aug. 9, 2018 (Aug. 9, 2018)] Retrieved from the Internet , entire document, especially Abstract; p. 4, col. 1-2.

Carrie Armel, "Energy Disaggregation", (Dec. 2011), Precourt Energy Efficiency Center, Stanford. (Year: 2011).

Cetin et al. "Disaggregation and Future Prediction of Monthly Residential Building Energy Use Data Using Localized Weather Data Network." In: ACEEE Summer Study on Energy Efficiency in Buildings, Aug. 21-26, 2016 [online] [retrieved on Aug. 9, 2018 (Aug. 9, 2018)] Retrieved from the Internet , entire document, especially Abstract; pp. 4-8.

Feinberg, E.A. et al: "Load Forecasting", Chapter 12, State University of New York, Stony Brook, Aug. 29, 2004.

GB 2502062 A (Toshiba Research Europe Limited) Nov. 20, 2013 (Nov. 20, 2013) entire document (especially Abstract, Figs. 1, 2, 3a, 5-7, col. 2, line 17-col. 3, line 9, col. 3 lines 16-20, col. 5, lines 16-19, col. 8, lines 1-9, col. 14, lines 31-35, col. 18, lines 14-29, col. 18, line 33-col. 19, line 5).

Ruzzelli et al. 'Real-Time Recongnition and Profiling of Appliances through a Single Electricity Sensor' 2010 7th Annual IEEE Communications Society Conference on Sensor, Mesh and Ad Hoc Communications and Networks (SECON), Boston, MA, 2010, pp. 1-9.

Zhang, Residential Electric Load Disaggregation for Low-Frequency Utility Applications, 2015, IEEE, pp. 5 (Year: 2015).

Zoha, Non-Intrusive Load Monitoring Approaches for Disaggregated Energy Sensing: A Survey, Sensors, pp. 29 (Year: 2012).

International Search Report for PCT/US2018/036012 completed Jul. 25, 2013; 2 pages.

(56) References Cited

OTHER PUBLICATIONS

International Search Report for PCT/US2018/018410 completed Apr. 26, 2018; 2 pages.
International Search Report for PCT/US2018/036012 completed Aug. 10, 2018; 2 pages.
Writtin Opinion of the International Search Report for PCT/US2018/036012 dated Aug. 31, 2018; 31 pages.
Written Opinion of the International Search Report for PCT/US2013/038268 dated Jul. 30, 2018; 7 pages.
Written Opinin of the International Search Report for PCT/US2018/018410 dated May 30, 2018; 5 pages.

* cited by examiner

ENERGY DISAGGREGATION TECHNIQUES FOR LOW RESOLUTION WHOLE-HOUSE ENERGY CONSUMPTION DATA

RELATED APPLICATIONS

This application is a continuation off of U.S. patent application Ser. No. 13/870,838, filed on Apr. 25, 2013, which claims priority to U.S. Provisional Patent Application Ser. No. 61/638,265, filed on Apr. 25, 2012, entitled "Smart Meters Energy Load Profile—Use of Training Data Set with High Information Content to Generate Value out of Test Data Set with Low Information Content." This application also claims priority to U.S. Provisional Patent Application Ser. No. 61/754,436 filed on Jan. 18, 2013, entitled "Novel Applications Using Appliance Load Profiles Generated from Non-Intrusive Load Monitoring." Each of these applications is incorporated herein by reference in its entirety.

BACKGROUND OF THE INVENTION

The present invention is generally directed to systems and methods of non-intrusive appliance load monitoring ("NIALM"). Specifically, the present invention is directed to different techniques for disaggregating low resolution data to determine certain or specific appliance usage.

Appliance load monitoring is an effective way to communicate to users the amount of energy usage required by various appliances. Presenting users with such information in an understandable format allows users to take appropriate action to actively reduce total energy consumption. Moreover, providing itemized information per specific appliance also permits users to determine if acquiring a new or replacement appliance (for example, through purchase, lease, or rental) would reduce energy costs sufficient to validate the price of purchase, lease, or rental. NIALM enables the breakdown of electricity usage for a property without entering the property or applying any sub-metering devices on the individual appliances/devices/loads inside the property. In general, NIALM is known in the prior art. For example, U.S. Pat. No. 4,858,141 to Hart et al. ("Hart") discusses basic techniques for performing NIALM. Hart teaches generating and using appliance load signatures to extract information for individual loads from whole property load profile data measured by the utility meter. As taught by Hart, information extracted from the utility meter may comprise: power consumption; times when the appliance/load was turned on and off; and appliance/load health.

There has been research in the area of NIALM and various papers have been published on techniques used to define load signatures and run pattern recognition algorithm on the load profile of the property under inspection. Typically, a software analysis is performed on past data collected Therefore such prior art techniques may be useful in breaking down the energy usage or itemizing the electric energy bill post-consumption, but fail to provide near real-time information that may immediately empower users to modify their energy usage. With regard to appliances such as heating or air conditioning—for which usage is based upon immediate conditions—such data of previous usage may provide limited assistance in modifying present behavior and usage.

Moreover, most published techniques use data at a high sampling rate (ranging from one sample every second to one million or more samples per second). However, several available sources of energy use data do not provide such high resolution data that typically enables specific appliance signatures to be extracted. For example, while utility companies collect data usage, this is typically performed for validation of billing cycles, and is generally collected at a fifteen (15) minute or one hour interval. Accordingly, this data is generally not specific enough for most published NIALM techniques to perform a useful energy disaggregation and generate a clear appliance signature.

While the prior art may teach various devices for monitoring and determining power usage (for example, U.S. Patent Application Publication No. 2009/0045804 to Durling et al. ("Durling")), such devices generally require additional components to be installed or specific devices to be utilized. In addition, prior art techniques and devices have drawbacks in that such devices and techniques generally provide a relatively low confidence level of identifying specific appliances. Such techniques and devices typically do not utilize the most knowledgeable party—the user himself—and also generally fail to account for additional non-electrical information that may be available.

Moreover, prior art techniques and methodologies may provide users with some basic information regarding their power consumption—but fail to provide the user with any additional advice or counseling as to how to effectively use the information to reduce energy consumption. Rather, the user is left with the notion that he or she should simply use particular appliances less often. This information is relatively meaningless with regard to appliances that users generally must use—for example, refrigerators, electric ranges, washing machines, dryers, etc. In addition, with regard to economic efficiency, the time of energy usage may dictate the cost of such usage. For example, during peak energy usage times, utility companies may charge increased rates than during low usage times. Merely changing the time of day a particular appliance is used may result in significant cost savings.

Accordingly, it is desirable to provide systems and methods that can provide energy disaggregation on low resolution data. More specifically, it is desirable to provide systems and methods to perform NIALM on data sampled at a rate of approximately one (1) minute or larger.

SUMMARY OF THE INVENTION

Some aspects of the present invention may include methods for creating an appliance signature based upon a low resolution whole house profile, comprising: receiving at a processor the low resolution whole house profile; selectively communicating with a first database comprising non-electrical information; selectively communicating with a second database comprising training data; and determining by the processor based on the low resolution whole house profile, the non-electrical information and the training data, individual appliance load profiles for one or more appliances.

Other aspects of the present invention may comprise methods for creating an appliance signature based upon a low resolution whole house profile, comprising: receiving at a processor the low resolution whole house profile; selectively communicating with a database comprising: non-electrical information comprising community specific parameters and specific home parameters; and training data; and determining by the processor based on the low resolution whole house profile, the non-electrical information and the training data, individual appliance load profiles for one or more appliances, wherein the determination comprises: receiving electric data associated with one or more appliances in the whole house profile from sensors or other recording means; recording the electric data and the one or more appliances as training data in the second database;

receiving the whole house profile and determine, based on resulting models, identify incidences of occurrence and/or usage of various appliances identified in the training data; and applying information received from any other sensors or users, if any, to increase the accuracy of the identified incidences of occurrence and/or usage.

These and other aspects will become apparent from the following description of the invention taken in conjunction with the following drawings, although variations and modifications may be effected without departing from the scope of the novel concepts of the invention.

BRIEF DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular. Reference figures preceded with "S" (e.g., S100) indicates a step.

Note that while the preceding and following disclosure primarily discusses monitoring and reporting electric usage, it is fully contemplated by the applicants that such systems and methods disclosed herein may also be used to monitor other types of energy consumption—for example natural gas, propane, and water consumption.

Current government policies and the consumer attitudes are driving the electric, gas and water utilities to make the consumer energy, water and gas consumption data available. This information may be used by the consumers or consumer authorized third parties for specific presentation and analytics. At least one goal of the availability of such information is to empower consumer with actionable information and influence consumer behavior to participate in energy saving actions.

Yet, the consumption data collected by utilities may not always have the highest resolution and therefore information may be lost when the data is sampled. For example, this may result when data is collected at large time intervals or low frequency sampling.

However, utilizing methods and systems disclosed herein and according to some embodiments of the present invention, the consumption data captured by utilities may be analyzed, possibly with the aid of separately collected high resolution data. The analytics generated and results or conclusions may be applied to the low resolution data, therefore making it possible to help consumers save energy on a larger scale. This may be accomplished even though the data from utilities alone may not include information specific enough to generate same analytical results.

Figure 1:
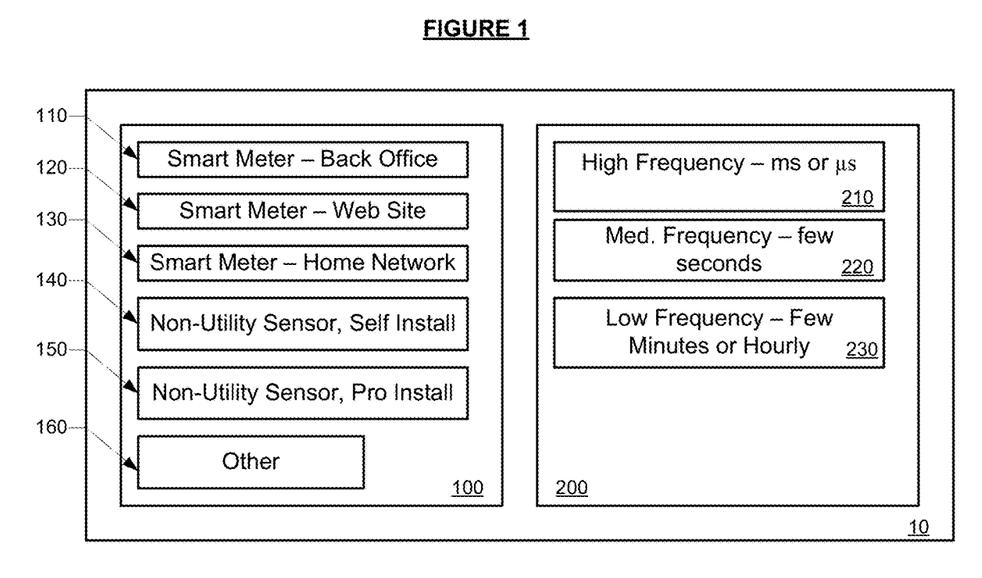
FIG. 1 depicts sources and resolution of data sets that may be used in accordance with some embodiments of the present invention.

With reference to FIG. 1, sources of data 100 and exemplary resolution of such data 200 will now be discussed. Sources of data 100 may vary, and may comprise elements such as: information from a processing utility 110 (which may be thought of as "back office" information, or information that is used by the utility typically for billing purposes, note that customer consent is likely need to obtain this information); information from a utility web site 120 (for example a customer may download account information and provide the same; alternatively, the customer may provide a third party with access and the third party may "scrape" the website of the utility); directly from the smart meter if there is a home area network 130; an additional, consumer installed, meter or usage sensor 140; an additional meter or usage sensor installed by a third party (not the utility) 150; or any other sort of data input 160.

The resolution of the data 200 may, in general, be divided into three categories of high resolution 210, medium resolution 220, and low resolution 230. High resolution data 210 may be sampled at a higher frequency, for example every millisecond or microsecond. Medium resolution data 220 may be sampled at a frequency of around every few seconds. Low resolution data 230 may be sampled at a low frequency, for example every several minutes or every hour.

In order to provide reliable, reasonably specific non-intrusive load monitoring ("NILM") on low frequency data, several overarching techniques may be used. For example, a first technique may comprise estimating a portion of energy from the whole house waveform that is attributed to a specific appliance category. Some appliances for example: pool pumps, air conditioners, furnaces, etc. may be able to be culled out of the whole house waveform. A second technique may be to use a training set to assist the system in learning the energy consumption patterns of various appliance categories in relation to specific signatures and/or parameters.

In order to properly "train" a system to disaggregate results from low resolution data, training data may be utilized. Training data may comprise a data set with medium or high resolution, and comprising information required to process non-intrusive load monitoring ("NILM") in order to extract information associated with individual appliances.

In contrast to the training data, actual data (or "test data") may comprise a low resolution data set that may not have sufficient content to process NILM algorithms. Such test data may be used to process high-level analysis, but results are generally inferior to analyses that process medium or high resolution data.

Note that training data can be data received from the actual home in question—for example, through user training directed at specific appliances in the home—or can be data associated with any number or plurality of other homes, neighborhoods, communities or other information. For example, in order to obtain more accurate results, a user can train appliances in his or her home. This data directly corresponds to the appliances used in the home. Accordingly, even when low resolution data is received, medium or high resolution training data provided by the user can be used to determine individual and/or specific appliance load profiles.

Alternatively, a user may not undergo the time or effort of training, instead relying upon a larger database of both non-electric data and training data received from others. In this situation, various features of the user's home (which may, for example, be identified through the use of non-electrical data, such as square footage, age of construction, heating or cooling degree days, etc.) may be identified in the training data.

Groupings of the training data may be utilized to provide a feature classification based upon the most comparable data. For example, home size may provide grouping. Data associated with a 1200 square foot home may not provide sufficiently comparable data to determine the load on a heating or cooling system used in a 4500 square foot home. Similarly, homes built during the same time period in the same geographic area are likely to have comparable insulation. Even the number of residents of a home may provide information useful in grouping the data. A home with two adults and five children will generally require laundry machines to run more often than single-person homes. Homes with pools may require the use of a periodic pool pump. Each of these features can be associated with stored training data.

Accordingly, low resolution data can be processed through a trained classifier or a regression model to determine the likely presence and operation of one or more specific appliances. The use of a trained classifier and/or regression model is discussed in further detail below.

Figure 2A:
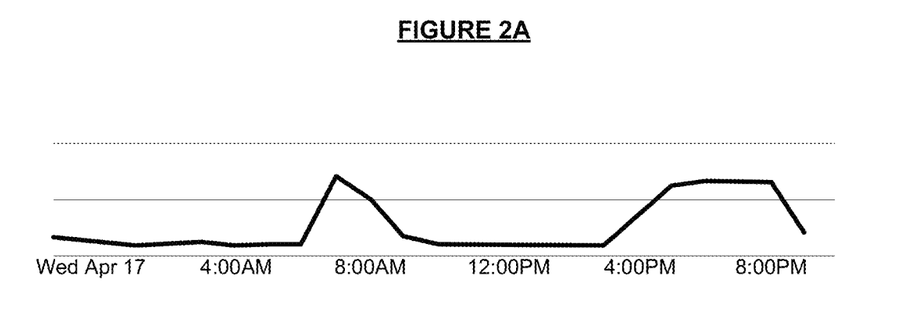
FIG. 2A depicts a test data set, in accordance with some embodiments of the present invention.
Figure 2B:
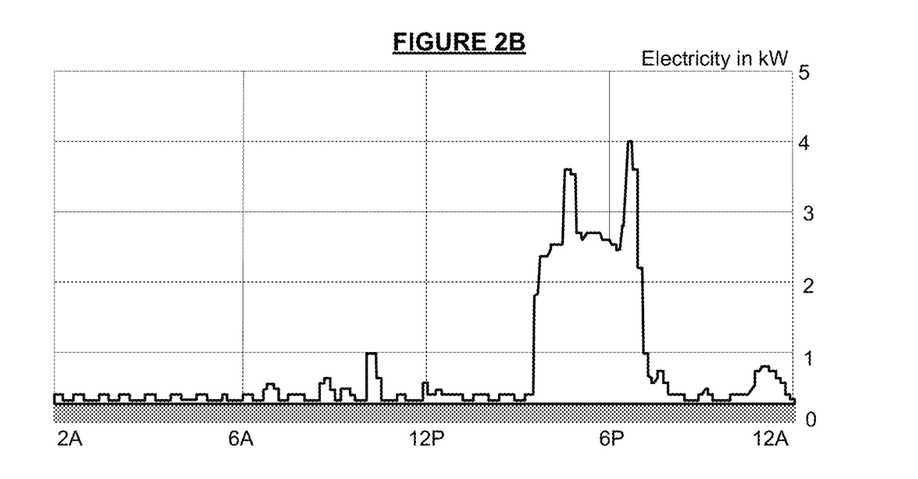
FIG. 2B depicts a test data set, in accordance with some embodiments of the present invention.
Figure 2C:
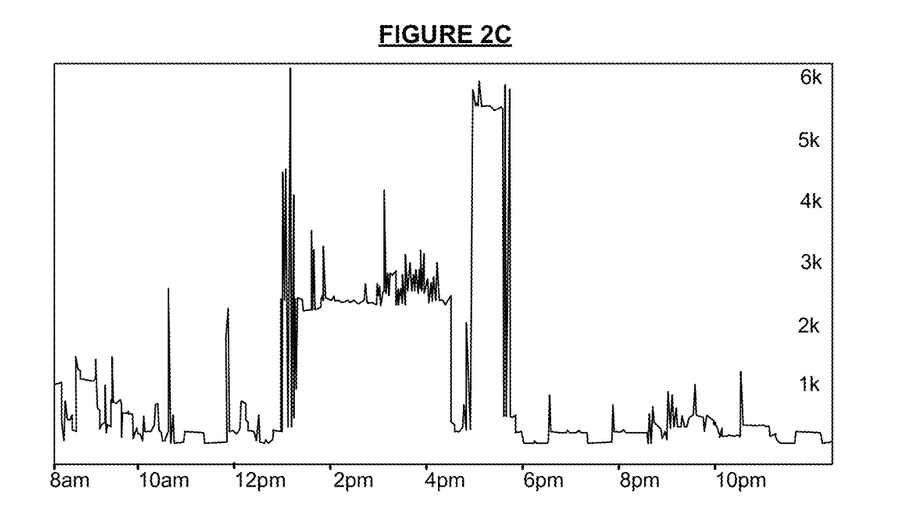
FIG. 2C depicts a training data set, in accordance with some embodiments of the present invention.

With reference to FIGS. 2A-2C the difference between low resolution test data and high resolution training data can be seen. FIG. 2A illustrates low resolution test data sampled at a frequency of once every hour (or every sixty (60) minutes). It can be seen that the waveform offers little details from which to determine specific appliance usage. FIG. 2B also illustrates low resolution test data, this time sampled at ten (10) minute intervals. While the waveform is more specific and certain aspects of NILM may be applied, the results would very high-level and not offer any degree of specificity.

In contrast, FIG. 2C illustrates a training data set comprising high resolution data. It can be seen that the information present in the waveform of FIG. 2C may be used in NILM techniques to disaggregate the waveform and determine specific appliance loads.

Figure 3:
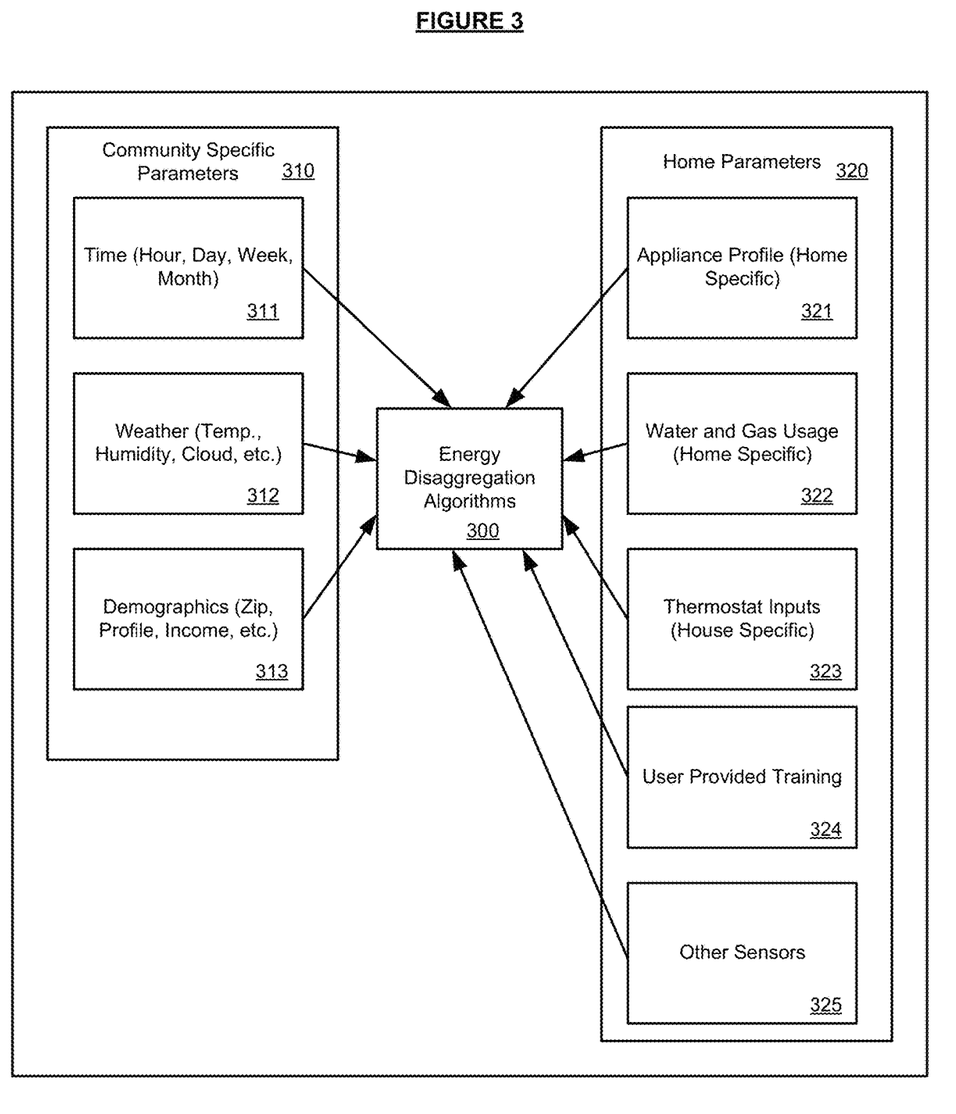
FIG. 3 depicts exemplary parameters used in energy disaggregation, in accordance with some embodiments of the present invention.

With reference to FIG. 3, different parameters that may be used in an energy disaggregation algorithm 300 will now be discussed. Energy disaggregation algorithm 300 may utilize various inputs, which may generally be broken into two categories: community parameters 310 and household parameters 320. Community parameters 310 may comprise elements such as, but not limited to, the time (e.g., the month, week, day, hour, minute) 311 of the sample; the weather conditions (e.g., the temperature, humidity, dew point, barometric pressure, recorded cloud coverage, sunrise/sunset times, etc.) 312, and even community demographics (eg., the average income and home profiles of the community, town, city, zip code, etc., the average age of family units in the community, etc.) 313.

Household parameters 320 may comprise attributes of a specific household, such as but not limited to: appliance profiles of the home 321, water and gas usage of the home 322, thermostat inputs from the home 323 (for example, thermostat set points, start and end times, temperature change rate, etc.), user provided training (discussed in greater detail below) 324, and/or any other sensor that may indicate when an appliance is turned on or off 325.

Note that other information may also be used, for example information referred to as "non-electrical information" in U.S. application Ser. No. 13/366,850 filed on Feb. 6, 2012 and entitled "Systems and Methods for Improving the Accuracy of Appliance Level Disaggregation in Non-Intrusive Appliance Load Monitoring Techniques," incorporated herein by reference in its entirety. Other such information may be satellite imagery of the specific house, neighboring demographics, tax records, determination of building mass and insulation levels, etc.

Regardless of whether the energy data is low, medium, or high resolution, the information and factors set forth in FIG. 3 may be utilized in NILM techniques.

Household-Specific Inputs and Training

Additional information may be desired in order to improve the accuracy of NILM techniques on low or medium resolution data. For example, the presence of a sensor to measure various appliance activity—or the use of user provided system training may provide additional accuracy in energy disaggregation. For example, inputs from a user or a sensor specifying the turn on and off times of a specific appliance may assist the system with learning the require power level, run time(s), cycle time(s), and/or other electrical and/or consumer use behavior. Because specific appliance information—and specific consumer behavior—often vary from household to household, such information can assist in generating accurate results from the disaggregation. In some situations, training may be provided on a recurring basis (for example, through the use of a permanently installed sensor, or through the repeated behavior of a user), or may only occur one or more times when the information is provided for future use.

User-Provided Training

Current methods of disaggregating a whole house waveform into individual appliances loads are generally based on obtaining accurate signatures of appliances for pattern matching in the whole house waveform obtained outside the property. Since the accuracy of the detection of appliances in current methods is dependent on matching the generic appliance signatures to the actual appliances in the property, it is often beneficial to have the user provide system level training to gather the property specific appliance signatures. This may be accomplished in several ways. Generally, methods of user training employed in the prior art require high level of effort by user to train the system and therefore run the risk of losing user interest in the system altogether. However, in accordance with some embodiments of the present invention, methods of gathering appliance signatures supported by user involvement will be discussed.

Specifically, a user providing feedback on energy disaggregation results indicating whether results were correct or marking periods using interactive charts or forms informing when a specific appliance was used. For example, with reference to FIG. 4, a user may train the system in real time by using a training mode. When the system goes into training mode, the user may turn an appliance on and off and the system may therefore learn the appliance signature in real time. With continued reference to FIG. 4, an exemplary method of user specific training 40 will now be discussed.

Figure 4:
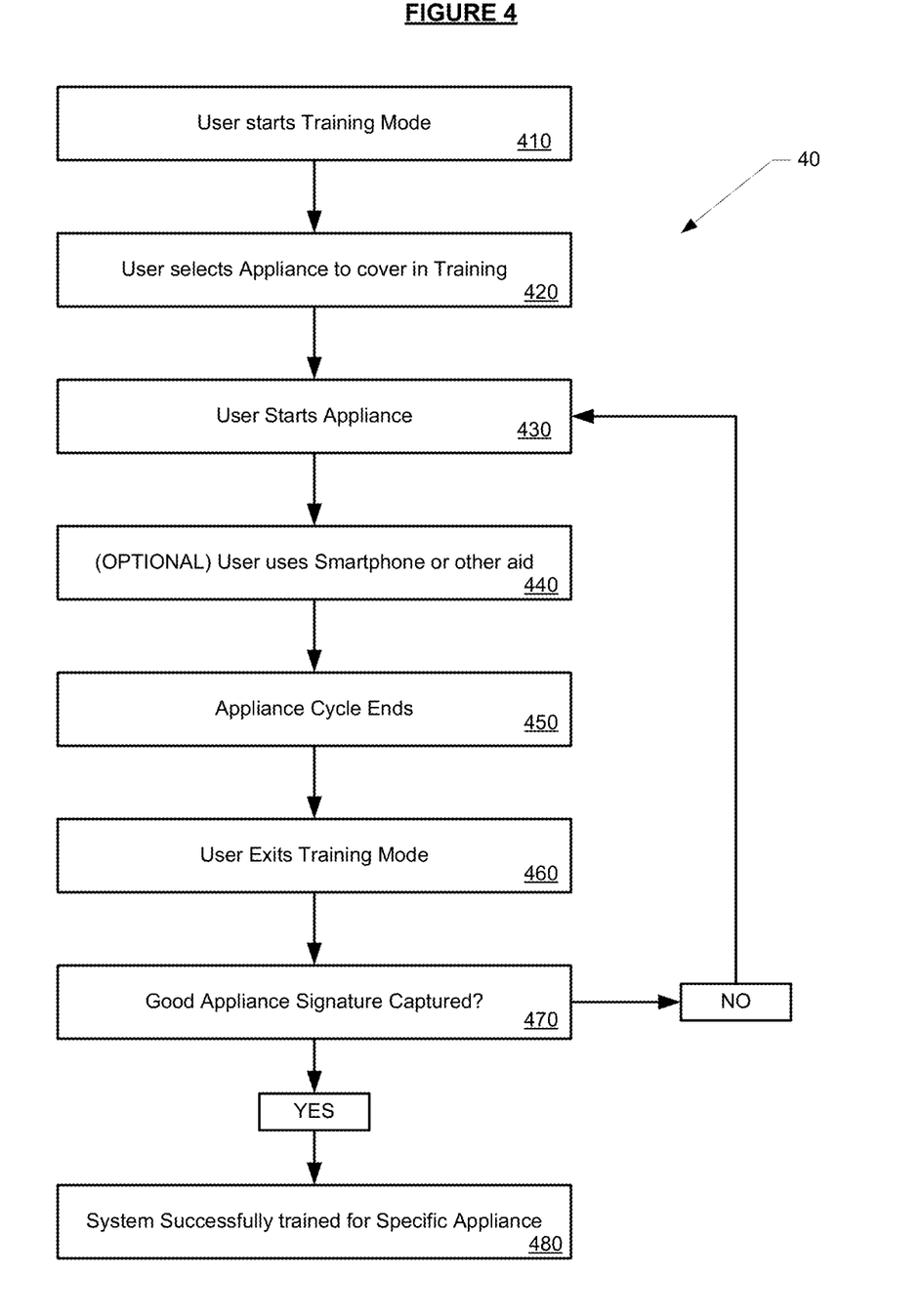
FIG. 4 illustrates an exemplary method of user specific training, in accordance with some embodiments of the present invention.

At step 410, a user may start the training mode. Starting the training mode may require the user to initiate a training sequence for the system, which may be performed by communicating with the system. This may be accomplished through user input into a website, application on a smart phone, thermostat input, telephone call, email, short messaging services, or any other sort of information. It is also contemplated that a user may record a training session on a device (such as a smart phone, tablet, laptop, or other electronic device) and may later upload the training session to the system after the training session is complete.

Regardless of whether the training session is indicated before the data is recorded or uploaded after the recordation of data, at step 420 the user may select an appliance that is going to be covered or used in the training. This selection may be through the selection on a website, application, etc. In accordance with some embodiments of the invention, this selection may be physically recorded by the user (i.e., written down) and later conveyed to the system or to a representative of the system.

At step 430 the user may start the appliance and allow the appliance to run through its normal cycle. It is also contemplated that a user may initiate an abbreviated or elongated appliance cycle in order to capture more, less, or different information than a normal cycle. At step 450 the appliance cycle may end, and if the user is conducting a real-time training or recording the training session, the training mode may be exited. At step 470 the system may determine if a good appliance signature was captured by the training session. If the appliance signature was not sufficient, a communication may be sent to the user requesting the user re-train the system with the specific appliance. Such communication may request additional actions, for example that the user cease using another appliance during training, or that the user allow the appliance to run through a full cycle. If a good appliance signature is not captured, the method may return to step 430 where the user starts the appliance for training again.

If a good appliance signature was captured, at step 480 the system may be successfully trained to identify the specific appliance. Note that in accordance with some embodiments of the present invention, optional step 440 may be used. Optional step 440 may comprise a user using an additional aid or input in the training session. For example, an application on a smart phone may be used (the application, may, for example, utilize the various sound, motion, and attitude sensors of the smart phone). For example, during the training mode, the smart phone can be placed on or near the appliance (or affected areas that indicate appliance operation) and real time behavior of the appliance may be recorded. Examples of such additional inputs may include, but are not limited to:

a. Sensing the vibration of a clothes dryer;
b. Determining heating ventilation and air conditioning ("HVAC") usage by recording the sound of airflow through an HVAC vent using a microphone;
c. Providing specific appliance information by utilizing the camera function to provide pictures of the appliance, or the appliance label, to determine make, model, functions, etc.
d. Determining when lights in a house are used through a light sensor;
e. Determining indoor temperature and set points using a temperature sensor;
f. Utilizing the GPS coordinates of a user's phone to deduce when a user is not at home, and using such information to correlate energy use with house occupancy.

In addition to user training, information may also be received from one or more various sensors installed temporarily or permanently in the household. Such sensors may provide various inputs that can be used in disaggregation of the overall house energy data. For example, information may be obtained from a thermostat, plug sensors, and/or voltage noise signature sensors.

Thermostats may, for example, provide set points, start and end times, and indoor and/or outdoor temperature. Plug sensors are temporary or permanent installed plug-level sensors that may indicate cycle times for appliances. Voltage noise signature sensors may be sensors installed on a wall plug that may detect when an appliance is turned on and off. Such sensors may also measure the cycle times of various appliance and may measure voltage noise signatures that can be used in NILM disaggregation systems.

Figure 5:
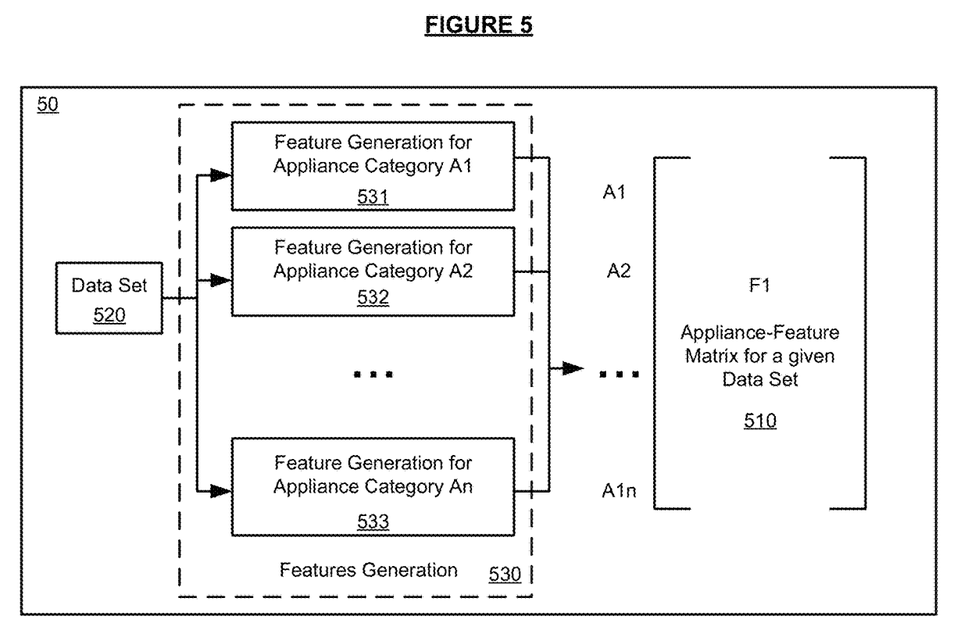
FIG. 5 illustrates an exemplary matrix for an appliance category, in accordance with some embodiments of the present invention.

With reference to FIG. 5, a feature matrix 510 may be generated for each appliance category. In general, an overall data set 520 may be analyzed and various features may be determined or generated 530. Features may be generated for each type of appliance category 531, 532, 533. Accordingly, an appliance feature matrix for a specific appliance category for a given data set 510 may be generated.

Figure 6:
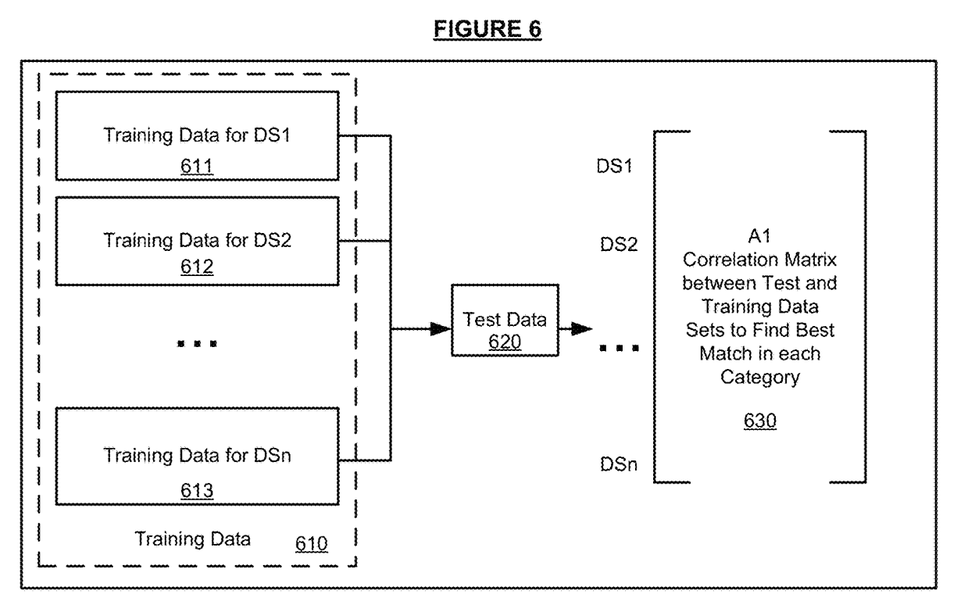
FIG. 6 illustrates an exemplary correlation home from a training home for an appliance category, in accordance with some embodiments of the present invention.

With reference to FIG. 6, training data 610 for each appliance category 611, 612, 613 may be gathered and correlated with test data 620. Test data 620 may be obtained through any number of the methods discussed above, or any combination of the methods discussed above. A correlation matrix 630 between the test data and the training data may then be performed to find the best match for each appliance category. In this manner, the training data can be used to properly identify appliance categories found in the test data.

Figure 7:
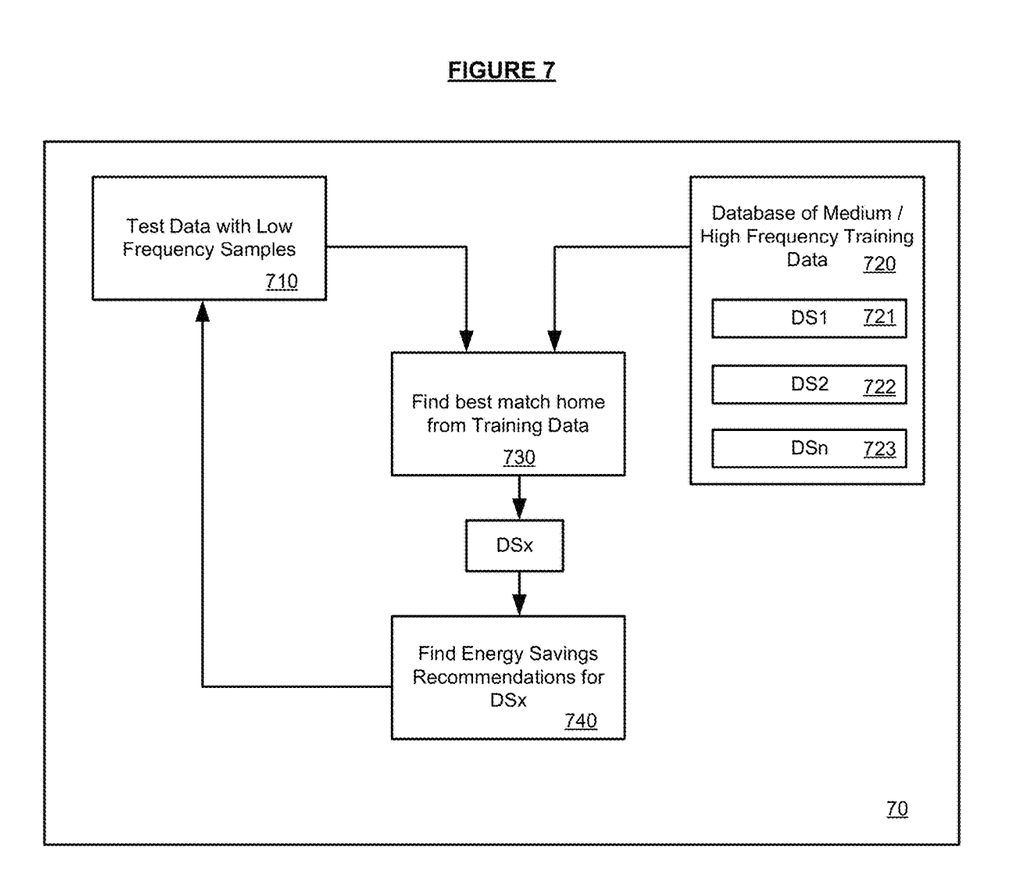
FIG. 7 illustrates a process that may be used to determine energy savings, in accordance with some embodiments of the present invention.

With reference to FIG. 7, a method of using training data sets to derive appliance energy information in accordance with some embodiments of the present invention will now be discussed. Test data 710—which may be low resolution test data—may be compared with a database of medium or high frequency training data 720. The database of training data 720 may comprise training data for different appliance categories 721, 722, 723. At 730, the test data 710 and the training data 721, 722, 723 may be compared to see if there is any match. If a match is found, at 740 energy saving recommendations may be determined based upon appliance energy itemization. In addition to passing on this information to a user, the results may also be cycled back into the test data (and potentially the database (not shown)) in order to provide a machine-learning environment that can iteratively improve its determinations and findings.

Energy Disaggregation Methods and Components

Once the data is captured—both test data and training data—various methods, models, and algorithms may be utilized to disaggregate the energy data into specific appliance loads. For example, Factorial Hidden Markov Models (HMM) may be utilized, as well as sparse approximation.

Factorial Hidden Markov Model

Using an HMM approach, a hidden Markov model may be used to uncover which appliances were turned on during each sampling interval. Each hidden state may correspond to a different combination of a limited number of appliances being on or off. For example, one state can represent the combination of a dryer and water heater in the on state, and the air conditioner off. It follows that the observed variable, the whole-house usage in the sampling period, is dependent of the state since it is dependent on which appliances are on. The HMM can use training data for various aspects of the model, e.g. the emission probability distributions for each state. However, HMM analysis may be performed without training data as well.

Note that an additive factorial HMM may allow the tracking of each appliance using its own Markov chain, with the observable variable (representing the whole-house power) equal to the sum of the state-dependent-output of the individual appliance/category chains. A noise variable or similar consideration may be used to account for any usage outside of the modeled appliances.

Sparse Approximation

Using a sparse approximation approach, a whole-house time series may be represented as a linear combination of a collection of signals (time-series), called a dictionary. Each signal or dictionary may represent the usage of an appliance across one or more sampling intervals. By enumerating various possible patterns for an appliance (e.g. an on-cycle start time), the dictionary can be constructed to represent all appliances. Therefore, under this method the whole house energy usage time series can be seen as a sum of signals, each corresponding to a usage of a particular appliance during a period of time. Alternatively, the section of a dictionary corresponding to each appliance may be a set of vectors obtained using training data for that appliance and a dictionary learning method. A sparse least square representation may be computed, and the coefficient vector may therefore explain which appliances occurred, the timing of such appliances, and the time-averaged usage or amplitude of such appliances.

Temperature Based Heating and Cooling Estimation

In addition to HMM and sparse approximation approaches, estimations may also be made based on temperature-based heating and cooling. In other words, the energy used by air conditioners or heating-related devices is generally intimately tied to temperature. Using this method, a starting point is the representation of the whole-house usage as a combination of (i) temperature-dependent components, each of which corresponds to AC or heating usage; and (ii) another component that generally does not vary with temperature.

The first component may then be extracted from the data based upon, at least in part, the temperature based heating and cooling. Temperature data may be converted to a variant of cooling or heating degree days, which may represent the need for cooling or heating in a given day or period. For example, the cooling degree days generally increase with every hour when the temperature exceeds a certain reference temperature (e.g. 65 F). This increase is generally proportional to the difference between external temperature and that baseline. A similar calculation may be used to compute heating degree days. The whole-house usage over several weeks/months may then be explained using a model based on heating and cooling degree days.

In the simplest case, where a linear dependency is assumed, a simple linear least squares regression may be used to separate the AC/heating. However, nonlinear analysis may also be used. In addition, regularizers may be used in the regression process (e.g. penalizing the squared norm of the linear weight vector) to significantly improve the solution. In the same vein, the optimization over the fitting error (often the total square error) can also be constrained (e.g. to produce nonnegative heating/cooling degree coefficients) to provide more stable and sensible solutions given the interpretation of the output.

Steps to discover or incorporate time of day or house occupancy patterns, determine the set point (set temperature) of a building, and/or any other non-electrical information as discussed above may be added to improve accuracy for a specific house.

In many cases, high/low temperatures during a certain period have little to no effect on cooling/heating usage, whereas deviation from the set temperature during other periods will result in a larger increase in heating/cooling energy use. A specific strategy is to break up the "cooling degree" calculations to correspond to different periods of the day (i.e. use only the temperature during certain hours for the calculation). In the example of linear regression, the whole house usage is represented as a linear combination which includes terms that relate to heating or cooling at different times of day. This not only allows for more accurate heating/cooling usage estimation, it can produce additional insight into to how this usage is distributed across different periods of time.

A similar breakup of the explanatory variables into heating/cooling degree calculations based on different reference temperatures can also be used to account for different set temperature settings across homes, and allow the system to search over models corresponding to more than one possible set temperature. As the number of regression features or explanatory variables increases, feature selection in some form may become crucial. For example, the model should not need to incorporate two features that both correspond to heating during the same hours (although some overlap in time may be acceptable). In the linear case, a norm penalty can ensure sparsity of the weight/coefficient vector.

Again, non-electrical data, such as learning from other similar homes (for example, according to certain criteria such as size, neighborhood, date of construction, etc.) may be used to help determine a recipe for extracting AC/heating usage. Moreover, the results may be refined with an iterative process, where the solution is designed to improve based on solution from previous iterations. An example of this, in accordance with some embodiments of the present invention, is to determine which data points are more relevant for analysis, or place different weights on different samples.

Estimations from Baseload Levels

Utilizing a base-load approach, an "always on" level estimate may be made for each house. This base-load of "always on" may then be subtracted from each home's data to remove one source of inter-house variation before further processing to extract other information. Base-load estimation may be used in conjunction with any of the methods discussed above in order to obtain more accurate or specific results.

In accordance with some embodiments of the present invention, the base-load may be calculated as a minimum value over a certain period, often one (1) day or longer. More broadly, the base-load estimated may be based on examining a subset corresponding to the lowest hourly usage. Such distribution of hourly usage may be analyzed to produce a base-load estimate (e.g. a mean). Note that it is contemplated that actual hourly usage may, at times, dip below the determined base-load. Accordingly, in accordance with some embodiments of the present invention, algorithms used may remove and/or ignore certain outlier data points. Also note that due to changing seasonal conditions, a separate base-load estimate may be made for each day/week/month etc.

Identifying Pool Pumps

In determining specific appliance loads from a whole house profile, it may be advantageous to remove loads from identified appliances. Pool pumps may often be recognized by their specific wave form and load characteristics. Removal of pool pumps from composite data may also assist in obtaining a more accurate or specific appliance load identification.

With regard to pool pumps, it can often be assumed that the pool pump will start and end at approximately the same time every day for some period of time (2 weeks, a month, a year, etc.). To infer the start time, duration, or amplitude of the pool pump data can be combined from several days, such that the pool pump usage becomes more prominent (due to schedule consistency and high amplitude. For example, in accordance with some embodiments of the present invention a match filtering approach may be used to identify the start time, and possible duration of the pool pump. Such filter may have a 24-hour periodicity, and examination of how the periods with the pool pump running differ from those where it is not running may be used to estimate the amplitude/wattage of the pool pump.

Figure 8:
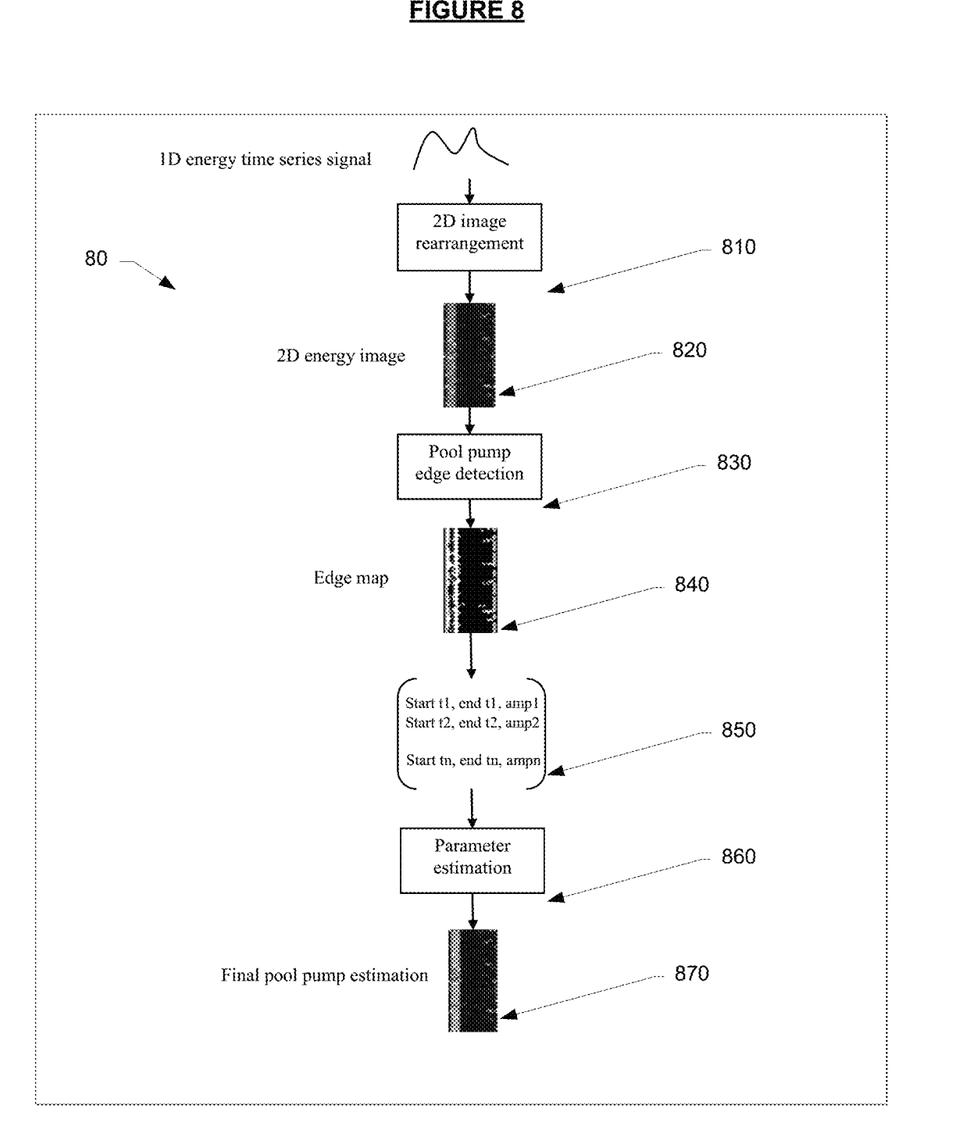
FIG. 8 illustrates an exemplary energy disaggregation technique for a pool pump, in accordance with some embodiments of the present invention.

With reference to FIG. 8, an exemplary energy disaggregation technique 80 for a pool pump, in accordance with some embodiments of the present invention will now be discussed. A one-dimensional low-resolution whole house energy time series data 810 may be rearranged 820 to a two-dimensional "image" 830. For example a one-hour-sampled signal of length n can be rearranged as a (n/24)×24 image (focusing on the case where n is a multiple of 24 with one-hour sampling), in which the ith row represents ith day sequence and "pixel" (i, j) reflects the jth hour energy usage. A higher intensity may represent a higher whole-house usage value. A pool pump edge detection 840 may be processed utilizing a reasonable assumption that the pool pump may start and end approximately the same time everyday across a period of time. Accordingly the pure pool pump pattern in the house energy image may be seen in the edge map 850 as a vertical stripe with stripe width approximately matching the duration and stripe length equal to number of days pool pump running consecutively.

Hence the pool pump identification and usage estimation may be seen as a vertical stripe detection problem in the corresponding image. A Sobel-like edge detection 860 with pool pump specific kernel design can be applied to find candidates for starting and ending times in the first stage. Each starting time and ending time pair 860 and an associated amplitude may constitute a candidate pump configuration. In the next stage, parameter estimation 870 of the final pool pump starting time, ending time and amplitude may be obtained via a search in that configuration space using candidate start and end times as starting points. This may refine the time estimate with a higher temporal granularity and may simultaneously rate the possible configurations using a numerical criterion. The numerical rating takes into account several factors, including the consistency of individual rising or falling pool pump edges, and how often a rising/falling edge pair coincide (occur on the same days). In addition, there may be a particularly high penalty if the usage falls below a minimum pool pump usage threshold dictated by the amplitude of a candidate configuration. A final pool pump estimation 880 may thus be obtained.

Note that the pool pump estimation routine discussed above may only be invoked when it is believed that a given house or user has a pool pump that is contributing to the total energy usage. The presence of a pool pump may be indicated by user input or obtained from other sources, such as a real estate or tax database. The source of this information can be indirect, requiring a layer of analysis before a conclusion about whether a pool pump is active in a house can be reached, e.g. via the processing of satellite images. However, even in the absence of the aforementioned inputs, automatic pool pump detection (i.e. whether the house has a pool pump) can be attempted using only the whole-house low frequency usage data. Variations may occur; for example, the process of pool pump usage and parameter estimation may be extended to use a similar numerical rating for the best configuration found to determine whether it corresponds to an actual pool pump. Various criteria computed in the search for a configuration or some variations may also be used as features in a supervised learning model that may be designed to determine whether a user even has a pool pump. When it is known whether the pool pump is present for a house then its data can be included in the training set. This approach may also be extended to determine the number of pool pumps present, even in the case where the number is greater than one.

Supervised Learning Based Energy Disaggregation

In addition to the methods and techniques discussed above, supervised learning may be used to perform one or more steps of energy disaggregation. Supervised learning may refer herein to an approach where another data set including single-appliance usage (i.e. labels) may be leveraged to learn a method. Training data (as discussed above) may come from the same household or from other households. Ground-truth information may be obtained by several means, including the output of disaggregation using higher-resolution data (e.g. with a one-second energy usage sampling period, this labeling can be imperfect), or the placement of individual plug-level sensors for each appliance.

In accordance with some embodiments of the invention, an approach to supervised learning may comprise the estimation of consumption of an appliance during an interval. As a non-limiting example, for data sampled at 1-hour intervals, an estimate can be made for every hour. The total consumption during that given period, as well as information about how that consumption changes before and after such period, may be used to make an estimate.

Such information may be preprocessed, encoded or transformed in several possible ways (for example, but not limited to a Fourier Transform, determining the difference between nearby data points, etc.). In addition, other vital information associated with the period/home, such as temperature, time of day, humidity, and other information discussed above may be used by a trained supervised learning algorithm (classification or regression) to output information about appliance-level activity in a given period (outside of the training set). The time data may therefore be transformed to reflect circular distance in the 24-hour-cycle (e.g. 23:00 is just as close to 00:00 as it is to 22:00). In accordance with this method, the single-appliance usage over a longer period may be obtained by aggregating over usage over the smaller intervals comprising it. The data can be used as a feature (variable or observable) directly, or it can be exploited in other ways, such as segmenting homes into groups based on certain attributes. The motivation behind this is to use training data only from homes in a similar category for disaggregation analysis in a given home, which are likely to share some characteristics or usage patterns on a whole-house or single-appliance level.

Grouping can be based on household size, amplitude of dryers, geographical area (zip code) and so on. Therefore, some of the available data fields can also be used for segmentation or clustering as a processing step, rather than a direct input or feature in supervised regression or classification. Moreover, other analysis such as the unsupervised approach can be used to segment or group homes based on heating and cooling usage. As an example, the temperature-based method can be used to identify homes which do not have any electric heating or cooling, and a separate model can be built and used for this class of homes. While this is an illustrative example, this may be applied more broadly—for example to segment homes based on heating/cooling characteristics and needs. Similarly, the output of other forms of analysis can be used as a means for home or user segmentation.

Alternatively, for the direct estimation of total usage during a longer period (e.g. week/month) by individual appliances, a variation of this approach which featurizes the whole-house time series (and others such as temperature) during that period using other methods. Examples of this include signal transforms, estimation of usage density for sampling period, smoothing, and other techniques to summarize activity without large sensitivity to small temporal variations in appliance cycle occurrence.

Two-Step Supervised Learning

Figure 9:
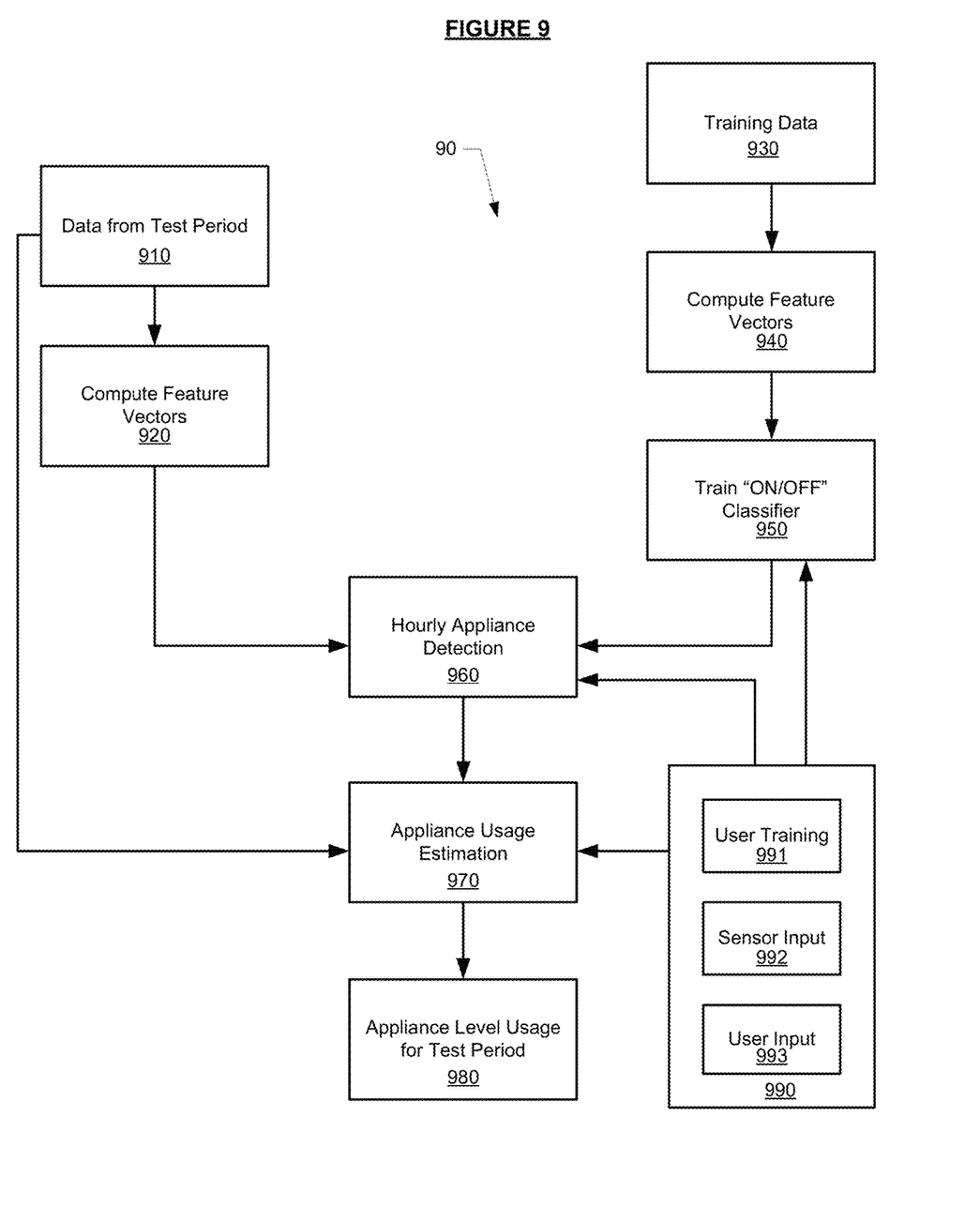
FIG. 9 illustrates an exemplary method of two-step training, in accordance with some embodiments of the present invention.

With reference to FIG. 9, an exemplary embodiment of two-step learning will now be discussed. In practice, supervised learning may be performed in a two-step process, comprising detection and estimation. In accordance with some embodiments of the invention, the problem may be broken up into a classification stage and another stage to calculate actual appliance usage in KW-hr or other unit of energy. In the classification stage, the supervised learning classifier (e.g. Support Vector Machine) may be used to determine whether an appliance is on or off during a period (e.g. 1-hour for data sampled at 1-hour intervals). This output may then be used in conjunction with whole-house usage at all time points to calculate single-appliance usage in an appropriate energy unit. This process (possibly indirectly) may infer to usage for the intervals when it is on (this is tied to the electric wattage of the appliances).

If the training data for the classifier is obtained from other households, then a home's own whole-house data may be used to make an inference related to an appliance cycle usage level. In one variant, the estimation may be accomplished by solving a system of linear equations with the sum of the appliances that are on during certain intervals on one side, and the whole-house usage during the corresponding intervals on the other side. This may yield a per-interval (e.g. per hour) coefficient that may be useful for aggregating single appliance usage over a period (containing multiple sampling intervals). This process may be further refined by incorporating other information, such as temperature. A separate classifier may be trained for each appliance, but several appliances may be combined and jointly trained for more than one appliance. This may be accomplished by converting it into a multi-class rather than a binary classification. In this case each class may correspond to a different combination of the separate appliances being on or off. Information specifying whether certain appliances are on or off at different times may come from a data source, such as a thermostat, or MHz-level electric monitor. In such circumstances, the corresponding output of the classifier/detection stage may be replaced with this information thereby removing a source of error. Such confirmation may also be used as another feature or for consistency checks of other methodologies.

User-provided information, such as the data obtained during a training mode, may provide concrete information about the appliance usage when it is on. This may be incorporated into the detection process for more accurate classification, or incorporated into the appliance usage estimation process. As a simple example, if a dryer amplitude or average cycle usage is known, a dryer cycle count in a time interval (e.g. week) may suffice for dryer usage estimation during that interval. This also applies to the approach in the next subsection (direct estimation).

With renewed reference to FIG. 9, an exemplary method 90 of a two-step training process will now be discussed. Steps of detection may comprise receiving or using data from a test period 910 or from training data 930. Data received from a test period 910 may be processed to compute feature vectors of the test data 920, as discussed above. Similarly, training data 930 may also be processed to compute feature vectors 940 of the training data. The training data may be further processed through an "on/off" type classifier 950, which may record and indicate known cycles of an appliance. As discussed in more detail below, an on/off classifier 950 may receive information and data from different training sources 990.

The feature vectors of the test data 920 and the feature vectors of the training data 950 may then be processed to detect hourly appliance usage 960, as noted above. From the hourly appliance usage 960, as well as test data and data from different training sources 990, an appliance usage estimation 970 may be obtained. And from this estimation 970, an appliance level usage for a test period 980 may be determined.

Note that throughout the process, information from training sources 990 may be utilized. Training sources 990 may comprise user training 991 data, as discussed above, input from sensors 992 (such as a smart phone, voltage sensor, etc.), as discussed above, and/or any other type of user input 993 that may assist in identifying the appliance, its timing, cycles, and/or profile.

One-Step Supervised Learning

In accordance with some embodiments of the present invention, a one-step supervised learning method may be employed. In this variation, a single estimation/regression stage using a feature set similar to that described above may be used to directly estimate usage. In this case a supervised machine learning regression algorithm may be used to relate such variables to single appliance usage during a sampling interval (e.g. one (1) hour). A separate solution may be obtained for each appliance, but multi-label or multi-target regression can jointly learn an estimator for all appliances using the training labels from all appliances. This may exploit relationships between the appliance usages.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense, and that the scope of the invention will be solely determined by the appended claims.

What is claimed is:

1. A method for learning an energy consumption signature associated with a specific appliance from energy consumption interval data sampled ranging from minutely to hourly associated with a specific house, comprising:
   receiving at a processor the energy consumption interval data;
   communicating by the processor with a first database comprising non-electrical information;
   communicating by the processor with a second database comprising training data, the training data comprised at least in part of:
      high resolution energy consumption data, sampled periodically with periods of less than one minute, received from a plurality of homes associated with appliances at least some of which of a same category as the specific appliance; and
      feedback information received from a user through an interactive user interface, the feedback information comprises one or more of an indication of whether previous appliance identification was correct and indicating when a specific appliance was used;
   determining a correlation between the energy consumption interval data and the training data;
   determining based at least in part on the correlation that the specific appliance was running during the acquisition of the interval data; and
   identifying the energy consumption signature of the specific appliance.

2. The method of claim 1, wherein the energy consumption interval data is received from one or more of the group consisting of:
   a smart meter;
   a meter data management system from a utility;
   a website of a utility; and
   a non-utility installed sensor or measuring device.

3. The method of claim 1, wherein the training data further comprises non-electric information comprises home and community specific attributes comprising one or more of the group consisting of:
   zip code;
   local weather;
   home size;
   home age;
   information about presence of various appliances in the household;
   thermostat data;
   gas consumption data; and
   water consumption data.

4. The method of claim 3 wherein the non-electric information is procured from sources other than the first database or second database.

5. The method of claim 1, wherein at least some of the training data in the second database is obtained by:
   running one or more disaggregation algorithms on the high resolution energy consumption data from the plurality of homes to produce a disaggregated appliance output;
   saving the disaggregated appliance output.

6. The method of claim 1, wherein at least some of the training data in the second database is obtained from user provided information about start and stop times of appliances in the user's home.

7. The method of claim 1, wherein the step of determining based at least in part on the correlation that the specific appliance was running comprises:
   segmenting or grouping training data based upon various criteria;
   receive the energy consumption interval data and determine a matching segment or group for analysis;
   train a classifier based upon the determined matching segment or group;
   use the trained classifier to identify occurrences of usage of the specific appliance in the energy consumption interval data.

8. The method of claim 1, further comprising detecting heating or cooling appliance consumption in the energy consumption interval data, comprising:
   selecting time intervals in which heating or cooling appliances are determined to be running;
   applying filters to ensure regularity of the heating and cooling appliance patterns.

9. The method of claim 1, wherein the step of learning the energy consumption signature of the specific appliance comprises:
   identifying any patterns of certain periodic loads in the energy consumption interval data;
   determining, based upon non-electrical data, whether the house has a pool;
   determining, based on scheduling consistency and the presence of a pool the existence of a pool pump;
   determining, based upon the existence of a pool pump and scheduling consistency of certain periodic loads in the energy consumption interval data, the individual energy consumption profile for the pool pump.

10. The method of claim 9, wherein a confidence level of energy consumption profile for the detected pool pump is calculated based on a number of attributes.

* * * * *